United States Patent Office 3,225,066
Patented Dec. 21, 1965

3,225,066
PROCESS FOR THE PREPARATION OF TETRA-HYDROFURAN-CIS, 2,5-DICARBOXYLIC ACID AND SALTS THEREOF
Baak W. Lew, Wilmington, Del., assignor to Atlas Chemical Industries, Inc., Wilmington, Del., a corporation of Delaware
No Drawing. Filed Apr. 18, 1963, Ser. No. 273,849
5 Claims. (Cl. 260—347.3)

The present invention relates to the production of tetrahydrofuran derivatives and in particular, to the production of tetrahydrofuran-cis, 2,5-dicarboxylic acid and salts thereof.

The products of the present invention are a useful source of plasticizers and resin intermediates, particularly adapted to use in polyester resin formulations.

In accord with the present invention, tetrahydrofuran-cis, 2,5-dicarboxylic acid and salts thereof may be prepared by hydrogenating dehydromucic acid or a salt of dehydromucic acid in the presence of a noble metal catalyst. The hydrogenation conditions are maintained for a time sufficiently long that two mols of hydrogen for each mol of starting material are reacted with the starting material.

The reaction may be expressed by the following equation:

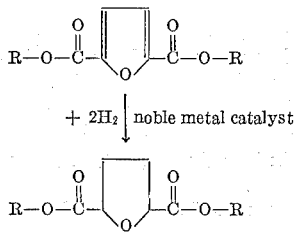

wherein R is independently selected from the group consisting of hydrogen, ammonium, and an alkali metal.

If tetrahydrofuran-cis, 2,5-dicarboxylic acid is the desired product, and the R utilized in the foregoing equation is not hydrogen, the reaction product may be acidified with a suitable acid, for example, hydrochloric, and the resulting product, tetrahydrofuran-cis, 2,5-dicarboxylic acid, extracted with a suitable solvent, for example, diethyl ether. The desired acid product may then be recovered by evaporation of the solvent.

While noble metal catalysts generally are suitable catalysts in the hydrogenation step of the present invention, it is preferred that the catalyst be supported. Suitable supporting materials are well-known in the art and include carbon, diatomaceous earth and clays. Sufficient catalyst is used to catalyze the process at a reasonable rate. Generally amounts upwards from about 0.25% by weight of the starting material are sufficient to fulfill the foregoing requirement. Usually amounts of catalyst over about 10% by weight of the starting material yield no obvious improvement. A suitable range of catalyst found to be efficient and economical for the present reaction is from about 0.25 to about 10% by weight of the starting material.

In carrying out the hydrogenation reaction of the present invention, it is desirable to avoid unduly high temperatures which would reduce the yield of tetrahydrofuran-cis, 2,5-dicarboxylic acid or derivative, by decomposition. The present invention, therefore, utilizes temperatures which are sufficiently high to carry out the reaction at a reasonable rate but are not high enough to cause undue decomposition of either the starting material or the reaction product. Temperatures of up to about 125° C. generally may be employed without difficulty due to decomposition. Temperatures of from about 15° C. or higher generally cause the reaction to proceed at practicable rates. The hydrogen pressure at which the reaction is carried out is not critical within a rather wide range, for example, the reaction may suitably be carried out with hydrogen pressures as low as 30 p.s.i.g. While pressures of over 2000 p.s.i.g. may be used, the expense of utilizing high pressure equipment, which would be required at such pressures, is not adequately compensated by an improvement in product yield.

The following examples are illustrative of the process of the present invention:

EXAMPLE 1

A mixture of 10 grams of dehydromucic acid (0.064 mol), 50 cc. of water and 4 grams of a 5% by weight palladium on carbon catalyst were placed in a pressure vessel. The contents of the vessel were then subjected to a hydrogen pressure of 50 p.s.i.g. The vessel was placed in a shaker and the hydrogenation conducted at ambient temperatures. After a period of 4 hours, the pressure in the vessel diminished to 40.2 p.s.i.g. The shaking was stopped, but the pressure was maintained. After a total of 20 hours, the pressure had lowered to 39.1 p.s.i.g. indicating a take-up of 2.1 mols of hydrogen per mol of dehydromucic acid. The mixture was removed from the pressure vessel and filtered. The filtrate was concentrated to dryness. The yield of dried material was 9.3 grams, a 91% yield. Recrystallization from acetone-heptane yielded the final tetrahydrofuran-cis, 2,5-dicarboxylic acid product having a melting point of 123–124° C.

EXAMPLE 2

10 grams of dehydromucic acid (0.064 mol), 135 cc. of water and sufficient sodium hydroxide to adjust the pH of the mixture to 6.5 were placed in a pressure vessel. 2 grams of a 5% by weight palladium on carbon was added. The mixture was placed under a pressure of 50 p.s.i.g. of hydrogen. The vessel was placed in a shaker and the hydrogenation was carried out at ambient temperature. In 6 hours, the pressure had dropped to 42.8 p.s.i.g. indicating a take-up of hydrogen by the reaction mixture. The shaker was stopped and the pressure recharged to 50 p.s.i.g. The vessel was again placed in a shaker and the hydrogenation continued until the reaction conditions had been maintained for 24 hours. The pressure at that time was found to be 47 p.s.i.g., indicating a take-up of 2.0 mols of hydrogen per mol of dehydromucic acid. The reaction mixture was then filtered. 12 cc. of concentrated hydrochloric acid was added to the filtrate. The acidified mixture was then evaporated to 30 grams under reduced pressure. The concentrate was then extracted with diethyl ether to yield 9.9 grams of product or a 96.7% yield. Recrystallization of this material with acetone-isopropyl alcohol yielded a tetrahydrofuran-cis, 2,5-dicarboxylic acid product having a melting point of 123–124° C.

The following table shows the results of a series of crude product runs carried out in accord with the present invention. To illustrate, in Example 3, 78.0 grams of dehydromucic acid were charged into a suitable autoclave. 7.8 grams of a 5% by weight palladium catalyst supported on carbon was added along with 364 grams of water. A hydrogen pressure between about 1500 and 1650 p.s.i.g. was maintained in the autoclave, until the reaction pressure stabilized. The reaction temperature was increased from an initial 28° C. to 98° C. over a period of 0.5 hour and maintained at 98° C. for 1.5 hours. The product was then removed from the autoclave and filtered. The filtrate was evaporated to dryness. The yield of dried material was 78 grams. The tetrahydrofuran-cis, 2,5-dicarboxylic acid product from Example 3 had the following profile analysis: acid number of 688 and saponification number of 697. Examples 4 and 5 were conducted in a manner similar to Example 3, except in Examples 4 and 5, a charge of sodium hydroxide was added to the dehydromucic acid starting material giving a modified starting material consisting of a sodium salt of dehydromucic acid. In Examples 4 and 5 the autoclave product was acidified after hydrogenation. In each case, the final product was extracted from the autoclave product by the use of an acetone solvent. The final tetrahydrofuran-cis 2,5-dicarboxylic acid product was recovered by evaporating the solvent. Upon recrystallization these products melted at 123–124° C.

consisting of hydrogen, ammonium, and an alkali metal, in the presence of a supported noble metal catalyst with hydrogen under a pressure of from about 30 p.s.i. to about 2,000 p.s.i and at a temperature of from about 15° C. to about 150° C., for a period sufficiently long that two mols of hydrogen for each mol of starting material are reacted with the starting material to produce tetrahydrofuran-cis 2,5-dicarboxylic acid and salts thereof.

2. The process of claim 1 wherein each R is hydrogen.
3. The process of claim 1 wherein at least one R is sodium.
4. The process of claim 1 wherein the noble metal catalyst is palladium supported on carbon.
5. The process of claim 4 wherein the noble metal catalyst is 5% by weight palladium supported on carbon and is present in an amount of between about 5 and about 50% by weight of the starting material.

|  | Example Number | | |
|---|---|---|---|
|  | 3 | 4 | 5 |
| Dehydromucic acid, grams | 78.0 | 78.0 | 312 |
| 40% by wt. NaOH, grams | 0 | 99.8 | 398 |
| 5% by wt. Pd on C catalyst, grams | 7.8 | 7.8 | 31.2 |
| Water, grams | 364.2 | 264.4 | 858.8 |
| H$_2$ pressure, p.s.i.g | 1,500–1,650 | 1,450–1,550 | 1,500–950 |
| Time in hrs.—Temp., ° C | 0.5—28 to 98 | 1.0—35 to 100 | 0.5—75 |
|  | 1.5—98 | 1.0—100 | 1.0—100 |
| 37% HCl added, grams | 0 | 99 | 396 |
| Acetone extraction | No | Yes | Yes |
| Residue, grams | 78 | 81.9 | 318 |
| Analysis: |  |  |  |
| Acid No | 688 | 677 | 698 |
| Saponification No | 697 | 691 | 701 |

What is claimed is:
1. A process of preparing tetrahydrofuran-cis 2,5-dicarboxylic acid and salts thereof which comprises the steps of reacting a starting material having the general formula of

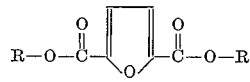

wherein each R is independently a member of the group

References Cited by the Examiner

Dunlop et al.: The Furans, A.C.S. Monograph No. 119 (1953), pp. 678–9.
Haworth et al.: J. Chem. Soc., London (1945), pp. 1–4.

NICHOLAS S. RIZZO, *Primary Examiner.*